United States Patent [19]
Freeman

[11] Patent Number: 5,394,745
[45] Date of Patent: Mar. 7, 1995

[54] FLUID PRESSURE TRANSMITTAL DEVICE

[76] Inventor: Forrest F. Freeman, 836 N. Nevada Ave., Montrose, Colo. 81401

[21] Appl. No.: 212,878

[22] Filed: Mar. 15, 1994

[51] Int. Cl.6 .................... G01L 7/00; G01M 15/00
[52] U.S. Cl. ................... 73/118.1; 73/117.3; 73/756
[58] Field of Search .......... 73/115, 116, 117.2, 73/117.3, 118.1, 756, 4 V

[56] References Cited

U.S. PATENT DOCUMENTS

| | | | |
|---|---|---|---|
| 2,017,365 | 10/1935 | Klein | 73/756 |
| 4,577,511 | 3/1986 | Wetzel | 73/756 |
| 4,598,581 | 7/1986 | Brekke | 73/117.3 |
| 4,788,871 | 12/1988 | Nelson et al. | 73/756 |
| 4,885,934 | 12/1989 | Freeman | 73/756 |
| 4,901,761 | 2/1990 | Taylor | 73/756 |
| 5,076,280 | 12/1991 | Moriuchi et al. | 73/756 |
| 5,148,712 | 9/1992 | Cross et al. | 73/756 |
| 5,295,747 | 3/1994 | Vinci | 73/756 |
| 5,324,114 | 6/1994 | Vinci | 73/756 |

Primary Examiner—Richard E. Chilcot, Jr.
Assistant Examiner—George M. Dombroske

[57] ABSTRACT

A method and apparatus for gaining access to the fluid pressure in which a sharp pointed elongate tube transpierces the resilient wall of tubing of the vacuum system creating an opening through the wall which is in fluid communication with an in-take port of an internal combustion engine. The elongate tube bore providing passage way for fluid pressure transmittal, the elongate tube diameter being small enough to allow elasticity of the resilient wall to close the pierced opening after the elongate tube is withdrawn from the pierced opening. The elongate tube bore passage way providing means to transmit fluid pressure to a pressure responsive device or the like, and also provides means to inject fluid into the fluid that is in communication with the in-take port of an internal combustion engine.

13 Claims, 1 Drawing Sheet

5,394,745

FLUID PRESSURE TRANSMITTAL DEVICE

BACKGROUND

Internal combustion engines such as used in the modern automobile have provisions for using the vacuum pressures present in the in-take manifold to operate vacuum motors, sensors, and such, and diagnoses purposes of engine performance. The vacuum motors, sensors and such normally connect to the pressures within the in-take manifold by means of flexible resilient tubing. The construction of the vacuum system heretofore are not provided with means to easily connect service equipment such as a pressure indicating devices, in convenient locations of the vacuum system to measure the amount of pressure within the in-take manifold and vacuum system.

SUMMARY

Accordingly, the present invention has among its objects to provide an accurate means of measurement of pressures contained within the walls of the in-take manifold and the vacuum system.

Another object is to provide access to the vacuum pressures by the creation of a suitable opening where needed in the resilient wall confining the vacuum pressures.

Another object is to provide means of transmittal of the vacuum pressure to a suitable pressure responsive device to measure amount of vacuum pressure.

Another object is to provide a natural closing of the created opening after the removal of the elongate tube from the opening.

Another object is to provide a simple, easy, and inexpensive measurement of the vacuum pressures within the vacuum system.

Another object is to provide means of injection of fluids into the vacuum pressure in communication with the intake port of an internal combustion engine.

Another object is to provide means of diagnosing internal combustion engine vacuum pressures without disconnection of components of the vacuum system.

BRIEF DESCRIPTION OF THE DRAWINGS

Other objects and attendant advantages of this invention will be apparent from the following description taken in connection with the accompanying drawings in which.

DETAILED DESCRIPTION OF THE PREFERRED EMBODIMENT

Figure 1:
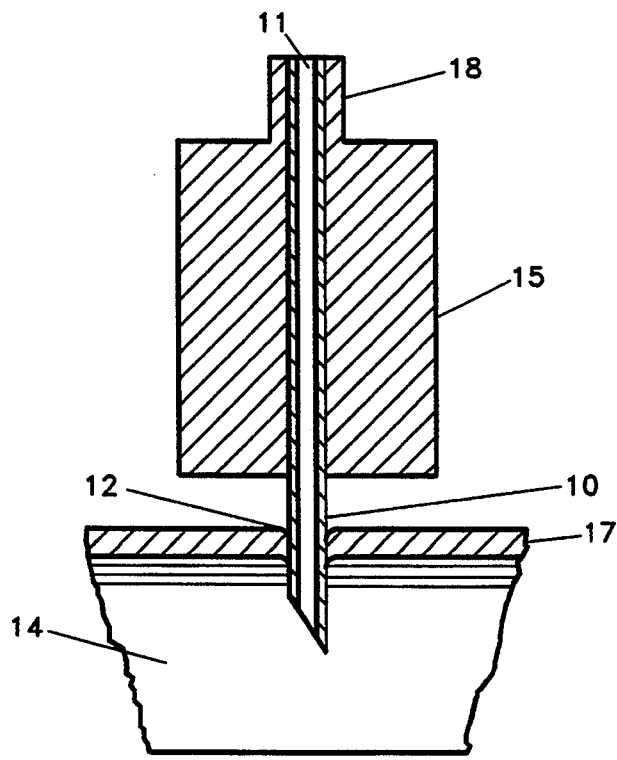
FIGS. 1 and 2 are cross-sectional views showing an embodiment of my invention.

Referring to FIG. 1 of the drawing an opening 12 that may be fabricated in any desirable location in the vacuum system, opening 12 being created by forcing the sharp point of the elongate tube 10 to transpierce wall 17 thereby making an elastic opening to squeeze fit the outside diameter of tube 10, tube 10 thereby transmitting the vacuum fluid pressure 14 through the hollow passageway 11 and connector 18 for connection to a suitable pressure indicating device. Handle 15 is provided to allow manipulation of the device during use.

Figure 2:
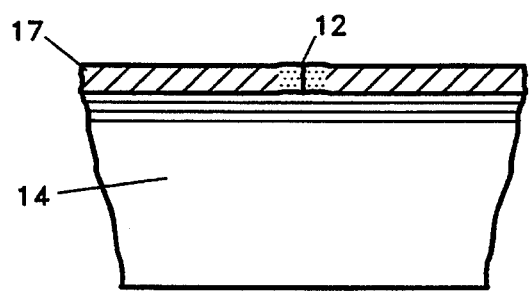

FIG. 2 of drawing showing the opening 12 that has closed by the elasticity of the resilient wall 17 thereby preventing atmospheric pressures to pass through the opening 12 and into the vacuum pressure 14 within wall 17.

Figure 3:
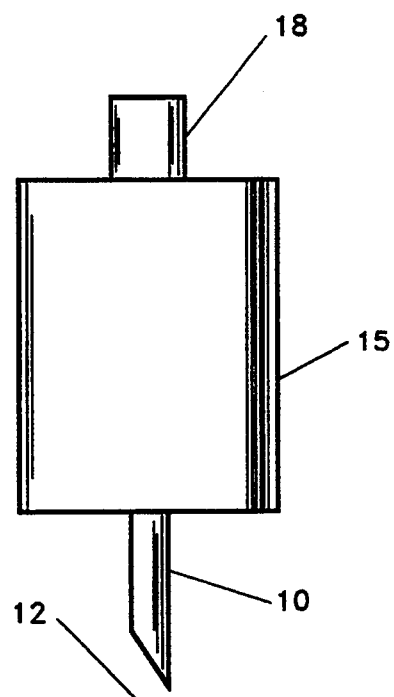
FIG. 3 is a view of an internal combustion engine vacuum system resilient tubing not showing engine vacuum supply connected or vacuum motors or sensors connected.
Figure 3:
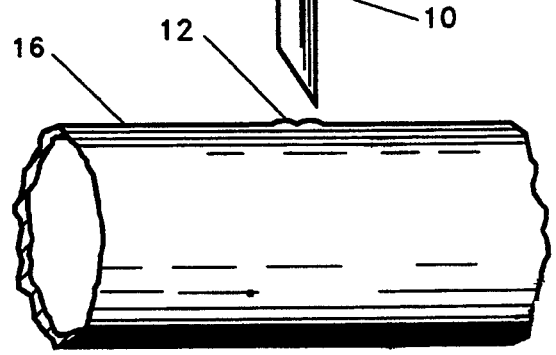

FIG. 3 showing the elongated tube 10 with handle 15 with a suitable connector 18 to connect to a pressure indicating device in relative view with flexible resilient tubing 16 such as removal of elongate tube 10 from closed opening 12 in actual use.

The embodiments of the invention are exceedingly easy, simple and inexpensive as compared with prior art of connecting a pressure responsive gauge by disconnecting various vacuum operated components in order to gain access of vacuum pressure, to measure the amount of pressures within the vacuum system, injection of fluids, and the like.

It is therefore understood that the invention is not restricted to the apparatus herein illustrated and described as various changes may be made in size and shape of parts and in character of the elements without departing from the spirit and scope of the invention as set forth in the following claims.

I claim:

1. An apparatus for measuring fluid pressure within a resilient tube connected to an internal combustion engine manifold, the apparatus comprising an elongate pressure transmitting tube, an end of said transmitting tube having means to transpierce a wall of the resilient tube, so that the transmitting tube allows pressure communication between the interior of the resilient tube and a means for measuring pressure, and wherein said resilient tube reseals itself when the transmitting tube is removed.

2. The apparatus of claim 1, wherein the resilient tube is in communication with an intake port of the engine.

3. The apparatus of claim 2, wherein the transpiercing means includes a sharp piercing point.

4. The apparatus of claim 3, wherein the transmitting tube provides a passageway for the injection of fluid into communication with the engine intake port.

5. The apparatus of claim 2, wherein the transpiercing means creates a hole whose diameter is such that the elasticity of the resilient tube closes the hole when the transmitting tube is removed.

6. The apparatus of claim 2, wherein the transpiercing means creates a hole whose diameter is such that ambient air is substantially prevented from entering the apparatus, thereby isolating the pressure within the resilient tube and the transmitting tube from the ambient atmospheric pressure.

7. The apparatus of claim 2, wherein the transmitting tube has a sharp piercing point on one end, and wherein the other end of the transmitting tube is adapted to be connected to the pressure measuring means.

8. An apparatus for gaining access to the vacuum pressure within a resilient vacuum tube which is in communication with an intake port of an internal combustion engine, the apparatus comprising an elongate pressure transmitting tube, said tube including sharply pointed means for piercing and penetrating a wall of the vacuum tube, so that the transmitting tube allows pressure communication between the interior of the vacuum tube and a means for measuring pressure, and wherein said vacuum tube reseals itself when the transmitting tube is removed.

9. A method for measuring the pressure in a resilient vacuum tube which is in pressure communication with an intake port of an internal combustion engine, comprising the steps of providing an elongate pressure transmitting tube which transmits fluid pressure from the interior of the vacuum tube to a pressure measuring means; creating an opening in a wall of the vacuum tube, said hole being sized to just receive an end of the pressure transmitting tube; inserting the transmitting tube into the opening; and withdrawing the transmitting tube from the opening so that the elasticity of the vacuum tube closes the opening, thereby preventing atmospheric pressure from entering the vacuum tube through the opening.

10. The method of claim 9, wherein the pressure transmitting tube includes a sharp point for piercing the wall of the vacuum tube.

11. The method of claim 9, wherein the opening is so sized that atmospheric pressure does not leak into the vacuum tube when the transmitting tube is inserted into the opening.

12. The method of claim 9, wherein fluid is injected into the vacuum tube via the transmitting tube.

13. The method of claim 12, wherein the pressure measuring means is replaced by a fluid injection means.

* * * * *